July 30, 1968

C. F. PHILLIPS, JR 3,395,348

SYSTEM FOR DETERMINING LOWEST VOLTAGE IN A PLURALITY
OF CHANNELS OPERABLE EVEN WHEN MORE THAN ONE CHANNEL
HAS THE SAME MINIMUM VOLTAGE

Filed July 8, 1964

INVENTOR.
CALVERT F. PHILLIPS Jr.
BY
*Wade Looney*
*George Fine*
ATTORNEYS 3,395,348
SYSTEM FOR DETERMINING LOWEST VOLTAGE IN A PLURALITY OF CHANNELS OPERABLE EVEN WHEN MORE THAN ONE CHANNEL HAS THE SAME MINIMUM VOLTAGE
Calvert F. Phillips, Jr., Annapolis, Md., assignor, by mesne assignments, to the United States of America as represented by the Secretary of the Air Force
Filed July 8, 1964, Ser. No. 381,273
3 Claims. (Cl. 324—103)

ABSTRACT OF THE DISCLOSURE

An apparatus for selecting minimum voltage in a plurality of channels, each of which is compared with the linearly rising voltage in a comparative circuit. Each comparative circuit output is delayed, the delay varying slightly for each channel for preventing pulse output from occurring simultaneously. The output is then differentiated and fed to respective AND gates and it is also fed to a bistable multivibrator which is connected to each of the AND gates.

---

This invention relates to a system for comparing the voltage level in a plurality of channels and more particularly to a system for identifying the channel having the lowest voltage wherein more than one channel has the same low voltage.

In my co-pending patent application entitled: System for Determining Lowest Voltage in a Plurality Of Channels having Ser. No. 382,274 and filed on even date herewith, a system was provided to identify the channel of a plurality of channels, having the lowest voltage impressed upon a charged capacitor wherein a pulse is generated. This present invention is an improvement of my invention disclosed in the co-pending application as one pulse is generated even if there are two or more charged capacitors having the same low voltage.

In a radar system where there are a number of channels, each having an integrating capacitor charged to a voltage during a radar interpulse period by an external source, each capacitor can have a different voltage at the end of the charging period. Circuitry may be needed to identify the channel having the lowest voltage on the charged capacitor by generating a pulse. This pulse would represent only the identification of the channel having the lowest voltage and there would be no requirement for indicating the actual amplitude of the voltage.

It is an object of this invention to provide a system of comparing the voltage levels in a plurality of channels.

Another object is to provide a system for identifying the channel having the lowest voltage in a plurality of channels.

It is still another object to provide a system for identifying the channel having the lowest voltage in a plurality of channels even if more than one channel has the same low voltage.

Figure 1A:
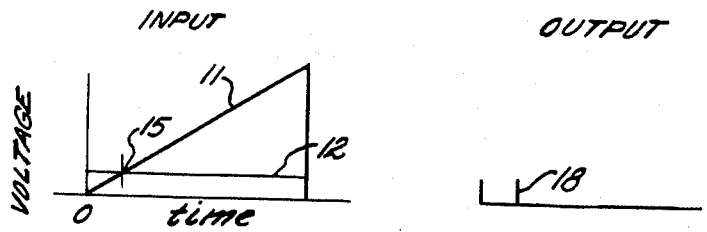
Figure 1B:
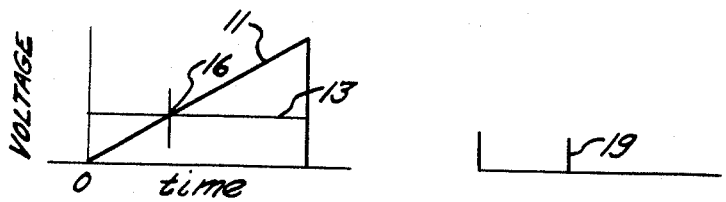
Figure 1C:
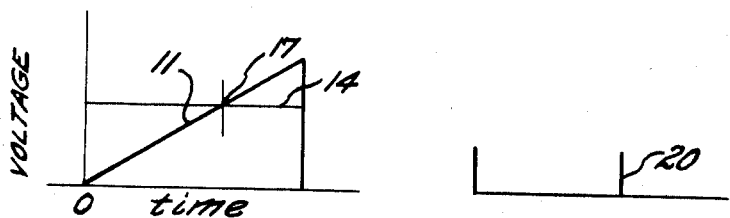
Figure 2:
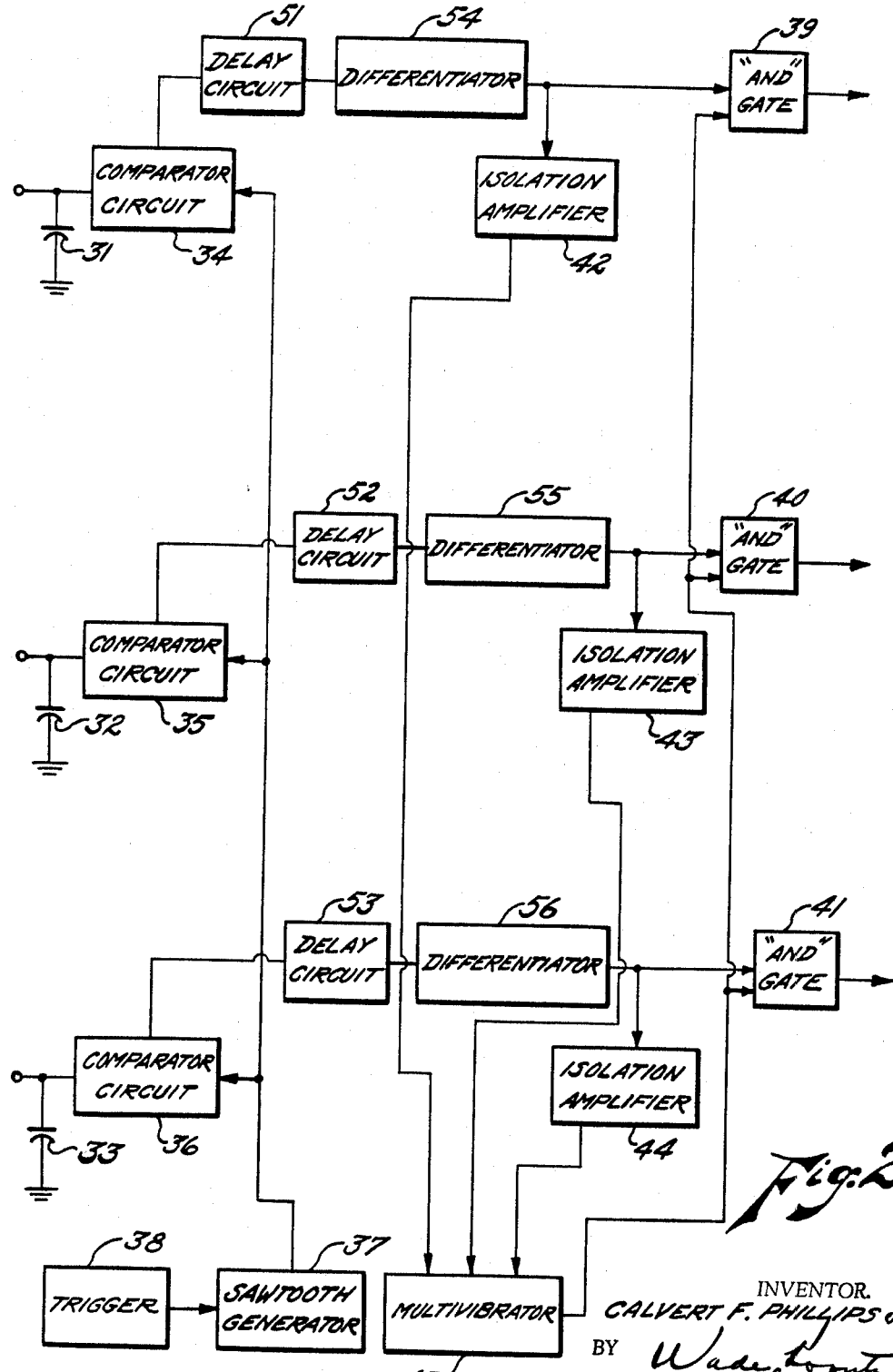

Other objects and features of this invention will become more apparent by reference to the following description when taken in conjunction with the accompanying drawings in which:

FIGURES 1a through 1c shows in diagrammatic form, the basic principle for converting voltage levels into time relationship; and FIGURE 2 is a block diagram showing an embodiment of this invention.

The voltage from each charged capacitor is mixed with a sawtooth voltage waveform or any increasing voltage such that when the amplitude of this voltage just equals the amplitude of the charged voltage, a pulse is generated. Circuitry appropriate for this use would be a typical balanced circuit employing two tubes with a common cathode resistor. The sawtooth voltage is applied to the grid of one tube while the capacitor voltage is applied to the grid of the other tube. A variable bias is also applied to the grid of the tube to which the capacitor voltage is applied in order to compensate for differences in the capacity of the capacitors. After the increasing voltage waveform has been applied, a clamping waveform is applied to discharge the storage or integrating capacitor.

FIGURES 1a through 1c shows how various values of constant or DC voltage can be converted to equivalent values of time. Sawtooth waveform eleven is compared with DC voltage values 12, 13, and 14. Voltage 12 will equal sawtooth voltage 11 at point 15 and an output pulse will be indicated at time 18. At a later time, the greater voltage 13 will equal sawtooth voltage 11 at point 16 and an output pulse will be indicated at time 19. At a still later time, the still greater voltage 14 will equal sawtooth voltage 11 and an output pulse will be indicated at time 20.

Referring to FIGURE 2, capacitors 31, 32, and 33 are tested to determine the one having the lowest voltage. The voltage on capacitors 31, 32, and 33 are compared in comparator circuits 34, 35, and 36 respectively, with the output of sawtooth generator 37 which is activated by trigger 38. When the voltage of capacitors 31, 32, and 33 equal the output of sawtooth generator 37, output pulses are generated by comparator circuits 34, 35 and 36.

The output pulses are delayed very short periods by delay circuits 51, 52, and 53. The delay increases slightly for each channel as compared with the preceding channel. Therefore, when two or more pulses occur at the output of comparator circuits 34, 35 and 36, only one pulse would be used.

The outputs from delay circuits 51, 52, and 53 are differentiated by differentiating circuits 54, 55, and 56 and are fed to AND gates 39, 40, and 41, respectively. The output pulses are also fed to bistable multivibrator 45 after being isolated from comparator circuits 34, 35, and 36 by isolation amplifiers 42, 43, and 44, respectively. The output of multivibrator 45 is fed into each AND gate 39, 40, and 41. The capacitor having the lowest voltage causes the comparator circuit associated therewith to produce the first output pulse which is thereupon fed into the associated AND gate. This output pulse is also fed to multivibrator 45 which produces an output that is fed to AND gates 39, 40, and 41. An output pulse is produced at the AND gate associated with the capacitor having the lowest voltage because of the coincidence of the input pulses. This identifies the capacitor having the lowest voltage. There are no outputs at the other AND gates because bistable multivibrator 45 is not in the proper state to produce an output that would coincide in time with outputs from the other comparaor circuits.

What I claim is:
1. An apparatus for determining the channel having the lowest voltage in a plurality of channels comprising:
 (a) means for generating an increasing voltage;
 (b) a plurality of comparator circuits each of which is connected to one each of the plurality of channels and to the generating means, the comparator circuit producing a pulse when the output of the respective channels just equals the output of the generating means;
 (c) a plurality of delay circuits, one each connected to the plurality of the comparator circuits, the delay varying slightly for each channel for preventing pulses from occurring simultaneously;
 (d) a bistable multivibrator connected to each of the outputs of the plurality of delay circuits;

(e) and a plurality of AND gates each of which is connected to the one each of the outputs of the plurality of delay circuits and to the output of the bistable multivibrator, the AND gates producing a pulse upon coincidence of outputs from the bistable multivibrator and the respective comparator circuits, thereby indicating the channel having the lowest voltage.

2. An apparatus for determining the channel having the lowest voltage in a plurality of channels comprising:
 (a) a sawtooth generator;
 (b) a plurality of comparator circuits each of which is connected to one each of the plurality of channels and to the sawtooth generator, the comparator circuits producing a pulse when the output of the respective channels just equals the output of the sawtooth generator;
 (c) a plurality of delay circuits, one each connected to the plurality of the comparator circuits, the delay for each channel varying slightly for preventing pulses from occurring simultaneously;
 (d) a bistable multivibrator connected to each of the outputs of the plurality of delay circuits;
 (e) and a plurality of AND gates each of which is connected to one each of the outputs of the plurality of delay circuits and to the output of the bistable multivibrator, the AND gates producing a pulse upon coincidence of outputs from the bistable multivibrator and the respective comparator circuits, thereby indicating the channel having the lowest voltage.

3. an apparatus for determining the channel having the lowest voltage in a plurality of channels comprising:
 (a) a sawtooth generator;
 (b) a plurality of comparator circuits each of which is connected to one each of the plurality of channels and to the sawtooth generator, the comparator circuits producing a pulse when the output of the respective channels just equals the output of the sawtooth generator;
 (c) a plurality of delay circuits one each connected to the plurality of the comparator circuits, the delay for each channel varying slightly for preventing pulses from occurring simultaneously;
 (d) a bistable multivibrator connected to each of the outputs of the plurality of delay circuits;
 (e) a plurality of isolation amplifiers one each interposed between the multivibrator and the respective comparator circuits;
 (f) and a plurality of AND gates each of which is connected to one each of the outputs of the plurality of delay circuits and to the output of the bistable multivibrator, the AND gates producing a pulse upon coincidence of outputs from the bistable multvibrator and the respective comparator circuits, thereby indicating the channel having the lowest voltage.

References Cited

UNITED STATES PATENTS

| | | | |
|---|---|---|---|
| 3,123,722 | 3/1964 | Ralphs | 328—147 |
| 3,189,875 | 6/1965 | Hendrickson | 340—172 X |
| 3,267,375 | 8/1966 | Olsen | 324—103 |

OTHER REFERENCES

A. J. Strassman, Automatic Measurement of Voltage Tolerances, Electronics, vol. 29, No. 2, February 1956, pp. 150–151.

RUDOLPH V. ROLINEC, *Primary Examiner.*

E. KARLSEN, *Assistant Examiner.*